(12) United States Patent
Huang et al.

(10) Patent No.: US 8,477,255 B2
(45) Date of Patent: Jul. 2, 2013

(54) LIQUID CRYSTAL DISPLAY DEVICE

(75) Inventors: Chi-Hsiang Huang, Hsin-Chu (TW);
Ci-Guang Peng, Hsin-Chu (TW);
Cheng-Wei Chang, Hsin-Chu (TW);
Chien-Hua Chen, Hsin-Chu (TW);
Hua-Chen Fan, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 304 days.

(21) Appl. No.: 12/955,458

(22) Filed: Nov. 29, 2010

(65) Prior Publication Data

US 2011/0255033 A1    Oct. 20, 2011

(30) Foreign Application Priority Data

Apr. 15, 2010   (TW) ............................... 99111814 A

(51) Int. Cl.
*G02F 1/1333*   (2006.01)

(52) U.S. Cl.
USPC .............................................. 349/58; 349/65

(58) Field of Classification Search
None
See application file for complete search history.

(56) References Cited

U.S. PATENT DOCUMENTS

| | | | |
|---|---|---|---|
| 2003/0128307 A1 | 7/2003 | Ito et al. | |
| 2007/0274670 A1* | 11/2007 | Tsai et al. | 385/147 |
| 2008/0043171 A1* | 2/2008 | Takahashi et al. | 349/65 |
| 2008/0111936 A1* | 5/2008 | Kim | 349/58 |
| 2010/0253872 A1* | 10/2010 | Park et al. | 349/58 |

FOREIGN PATENT DOCUMENTS

| | | |
|---|---|---|
| JP | 5080306 | 4/1993 |
| JP | 2000066204 | 3/2000 |
| TW | M323630 | 12/2007 |
| TW | 98120062 | 6/2009 |
| TW | 98136581 | 10/2009 |

OTHER PUBLICATIONS

English language translation of abstract of JP 5080306 (published Apr. 2, 1993).
English language translation of abstract of JP 2000066204 (published Mar. 3, 2000).
English language translation of abstract of TW M323630 (published Dec. 11, 2007).
English language translation of abstract of TW 98120062 (published Jun. 16, 2009).
English language translation of abstract of TW 98136581 (published Oct. 28, 2009).

* cited by examiner

*Primary Examiner* — Thanh-Nhan P Nguyen
(74) *Attorney, Agent, or Firm* — McClure, Qualey & Rodack, LLP

(57) ABSTRACT

A liquid crystal display device includes a light guide plate, a light source module, a first tape, a circuit board holder and an elastic support piece, an optical film, a panel, and an elastic buffer piece. By implement of the liquid crystal display device of this invention, the thickness and the weight of the liquid crystal display device can be reduced.

14 Claims, 9 Drawing Sheets

LIQUID CRYSTAL DISPLAY DEVICE

RELATED APPLICATIONS

This application claims priority to Taiwan Patent Application Number: 99111814, filed on Apr. 15, 2010, which is herein incorporated by reference

BACKGROUND

1. Field of Invention

The present invention relates to a liquid crystal display device. In particular, the present invention relates to a thin liquid crystal display device.

2. Description of Related Art

A conventional liquid crystal display mainly has a liquid crystal display module including a liquid crystal display panel and a backlight module. And generally, a frame (such as a plastic frame or a metal frame) is used to fasten the liquid crystal display panel and the backlight module.

Concerning the physical strength of the assembly of a liquid crystal display panel and a plastic frame and/or a metal frame, the frame cannot be removed from the liquid crystal display module to reduce its volume. Therefore, it is difficult to achieve a thin liquid crystal display module design based on the conventional assembling techniques. In order to meet the demands of thinning and shrinking the volume of a liquid crystal display module, it is required to improve the assembling structure of a liquid crystal display module.

SUMMARY

For this reason, the present invention provides a liquid crystal display device, which may reduce the weight, thickness, and costs thereof. The present invention provides a liquid crystal display device, including a light guide plate, a light source module, a first tape, a circuit board holder, an elastic support piece, an optical film, a pane, and an elastic buffer piece.

The light guide plate includes an upper surface, a lower surface, and a light input edge, wherein the upper surface and the lower surface are opposite to each other and adjacent to the light input edge. The light source module is disposed close to the light input edge. The first tape is wrapped externally and pasted on the light source module and the light guide plate. The circuit board holder is disposed upon the light source module and a part of the upper surface adjacent to the light input edge, and the first tape is disposed therebetween. The elastic support piece is disposed on the upper surface of the light guide plate and surrounds the periphery of the upper surface to form an accommodating space, and a part of the elastic support piece may be disposed on the circuit board holder. The elastic support piece may include rubber materials. The optical film is disposed in the accommodating space. The panel is disposed upon the elastic support piece and covers the accommodating space.

The elastic buffer piece is leaned on the outside of the panel and the light guide plate. That is, the elastic buffer piece is leaned on the outside edges of both the panel and the light guide plate other than the light input edge of the light guide plate. The elastic buffer piece preferably surrounds the three outside edges of both the panel and the light guide plate other than the light input edge of the light guide plate. The elastic buffer piece may include rubber materials.

According to an aspect of the present invention, a liquid crystal display device further comprises a second tape, which is pasted on peripheral area of the panel surface, outer surfaces of the elastic buffer piece and the lower surface of the light guide plate for wrapping and attaching the elastic buffer piece to three outside edges.

According to an aspect of the present invention, an elastic support piece comprises a trough which has an opening facing toward the accommodating space, and the optical film comprises a flange. The flange can fit into the trough for fastening the optical film within the accommodating space.

According to an aspect of the present invention, a light source module comprises a first circuit board and an light emitting component disposed on the first circuit board. The first tape is pasted on the lower surface of the light guide plate, a side of the first circuit board far away from the light emitting component, and the upper surface.

According to an aspect of the present invention, a liquid crystal display device further comprises a reflective plate which is disposed on the lower surface of the light guide plate. In this embodiment, the first tape is pasted on a side of the reflective plate far away from the light guide plate, a side of the first circuit board far away from the light emitting component, and the upper surface of the light guide plate.

According to an aspect of the present invention, a liquid crystal display device further comprises a second circuit board which is disposed on the circuit board holder and electrically connecting to the panel for driving the panel, wherein the circuit board holder comprises an ear portion protruding outward for supporting the second circuit board.

According to an aspect of the present invention, a first tape includes a reflective layer.

According to an aspect of the present invention, an elastic support piece includes a first prop component and a second prop component, wherein the first prop component is positioned between the panel and the circuit board holder, and the second prop component is positioned between the panel and the light guide plate. The top of the first prop component is as high as the top of the second prop component. That is, the tops of the first prop component and the second prop component are of the same height.

According to an aspect of the present invention, a circuit board holder covers the side of the light source module far away from the light guide plate, the side of the light source module far away from the first circuit board, and the upper surface of the light guide plate adjacent to the light input edge.

According to an aspect of the present invention, the edges of the panel are aligned to the three edges of the light guide plate other than the light input edge of the light guide plate.

In summary, by implementing a liquid crystal display device of the present invention, plastic frames or metal frames of a conventional liquid crystal display module are not needed. The thickness of a whole liquid crystal display device is therefore reduced to achieve the purpose for thinning a liquid crystal panel, and the weight can also be lightened effectively as well as remained its structural intensity. In addition, by implementing a liquid crystal display device of the present invention, the installation is easy and the cost is effectively lowered.

It is to be understood that both the foregoing general description and the following detailed description are by examples, and are intended to provide further explanation of the invention as claimed.

BRIEF DESCRIPTION OF THE DRAWINGS

Embodiments of the invention will now be described by way of example only with reference to the accompanying drawings in which.

DETAILED DESCRIPTION

Figure 1:
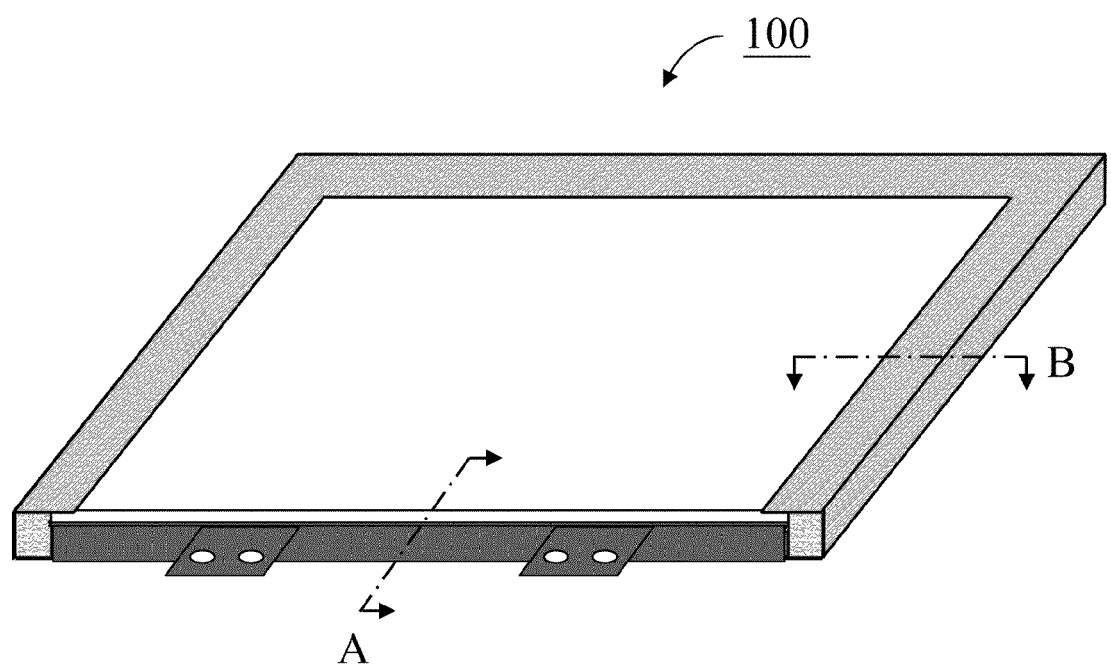
FIG. 1 is an illustration of an alternate embodiment of a liquid crystal display device of the present invention.

Reference will now be made in detail to the present embodiments of the invention, examples of which are illustrated in the accompanying drawings. Wherever possible, the same reference numbers are used in the drawings and the description to refer to the same or like parts.

The present invention provides a liquid crystal display device. In particular, a different assembly of the components of a display device is applied for thinning a liquid crystal display device. Reference will now be made in detail to the present embodiments of the invention, examples of which are illustrated in the accompanying drawings. Wherever possible, the same reference numbers are used in the drawings and the description to refer to the same or like parts.

Figure 2:
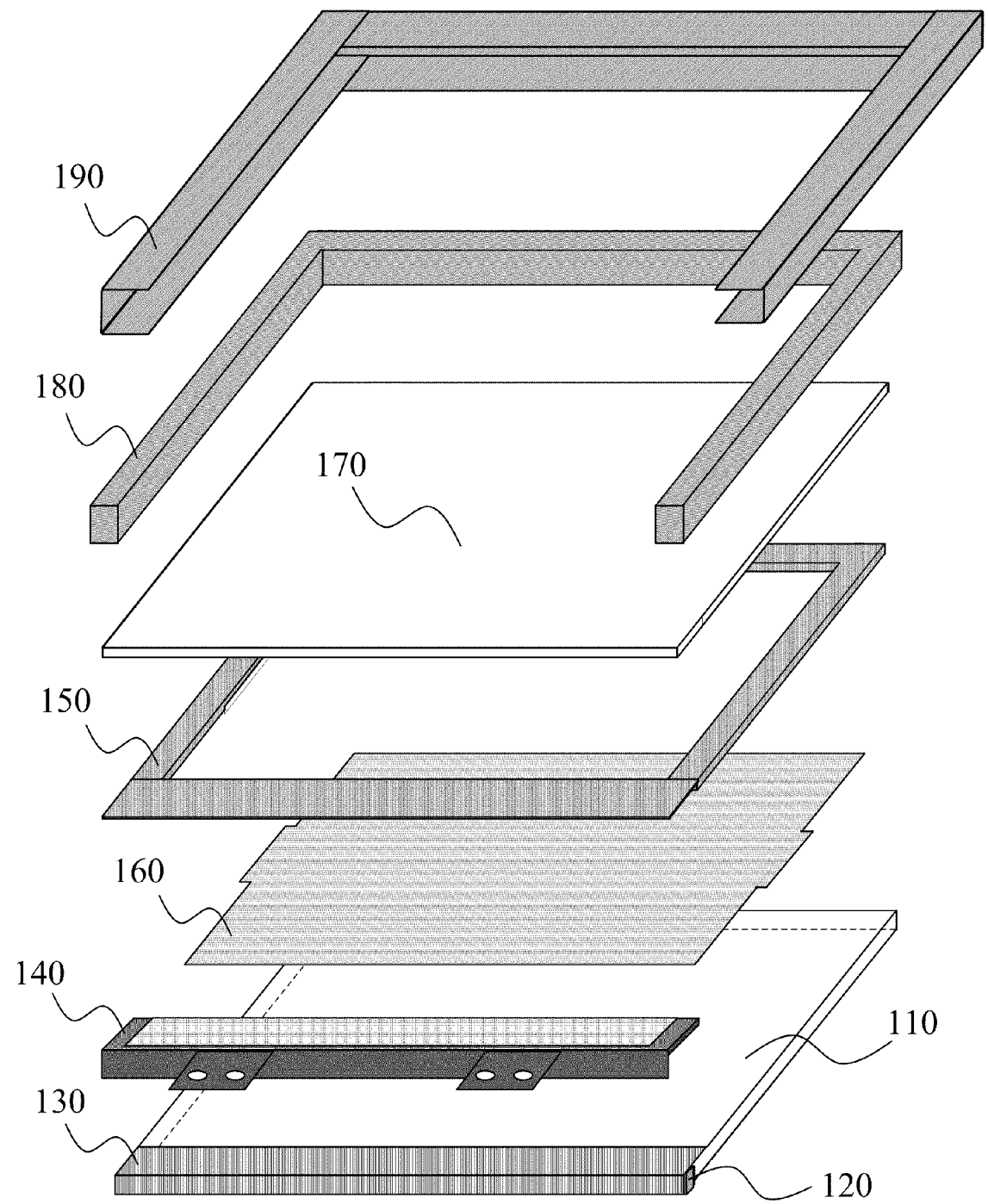
FIG. 2 is an exploded view of an alternate embodiment of a liquid crystal display device of the present invention.

Refer to FIGS. 1 and 2, which are an illustration and an exploded view of an alternate embodiment of a liquid crystal display device of the present invention, respectively. As shown in FIGS. 1 and 2, a liquid crystal display device 100 of the present invention includes at least a light guide plate 110, a light source module 120, a first tape 130, a circuit board holder 140, an elastic support piece 150, at least an optical film 160, a panel 170, and an elastic buffer piece 180. The corresponding positions and relations of the components of the present invention are described in details below.

Figure 3A:
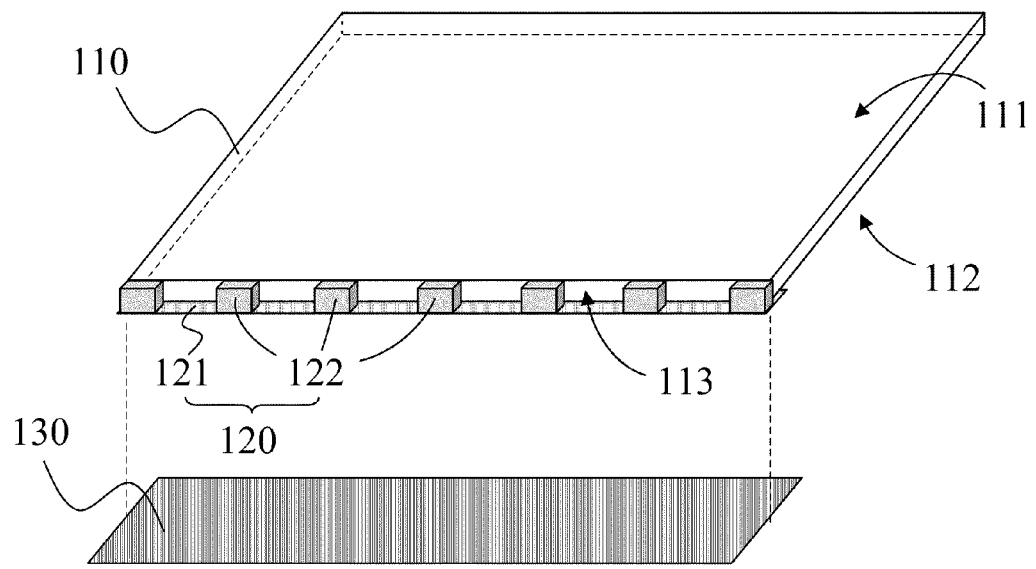
FIGS. 3A and 3B are drawings (I) of components of an alternate embodiment of a liquid crystal display device of the present invention.
Figure 3B:
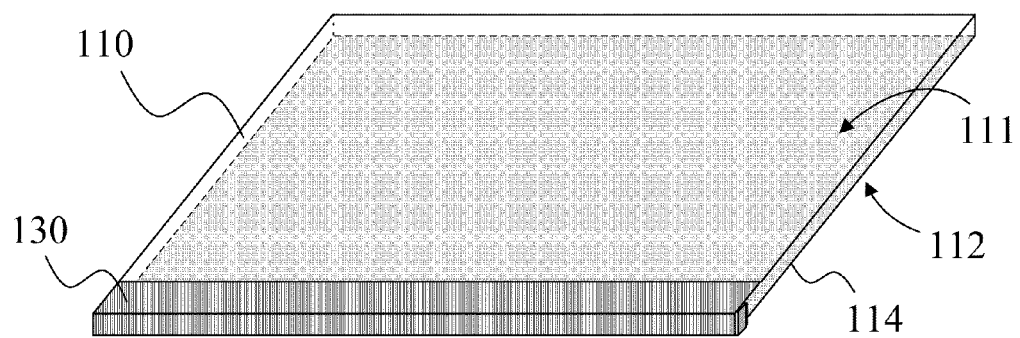

Firstly, the assembling relations among the light guide plate 110, the light source module 120, and the first tape 130 of a liquid crystal display device 100 are described herein by an alternate embodiment of the present invention. Refer to FIGS. 3A and 3B, which are drawings (I) of components of an alternate embodiment of a liquid crystal display device of the present invention. The light guide plate 110 includes an upper surface 111, a lower surface 112, and a light input edge 113, wherein the upper surface 111 and the lower surface 112 are opposite to each other and adjacent to the light input edge 113.

The light source module 120 is disposed close to the light input edge 113 of the light guide plate 110, so that the light source module 120 may emit light beam into the light guide plate 110 from the light input edge 113. The first tape 130 wraps externally and pastes on the light source module 120 and the light guide plate 110. The first tape 130 may include a reflective layer (not shown in the figure), which is provided for reflecting the light beam emitted out from the light source module 120 toward the light input edge 113 of the light guide plate 110. The light source module 120 includes a first circuit board 121 and light emitting components 122, such as light emitting diode, disposed on the first circuit board 121, and the first tape 130 is pasted on the lower surface 112 of the light guide plate 110, a side of the first circuit board 121 far away from the light emitting components 122, and the upper surface 111 of the light guide plate 110. Therefore, the light emitting components 122 are entirely wrapped by the first tape 130 and are leaned and attached to the light input edge 113 of the light guide plate 110.

Moreover, as another embodiment of the present invention shown in FIG. 3B, a liquid crystal display device 100 may further include a reflective plate 114 disposed on the lower surface 112 of the light guide plate 110. Therefore, the first tape 130 of this embodiment of the present invention is pasted on a side of the reflective plate 114 far away from the light guide plate 110, a side of the first circuit board 121 far away from the light emitting component 122, and the upper surface 111 of the light guide plate 110.

Figure 4A:
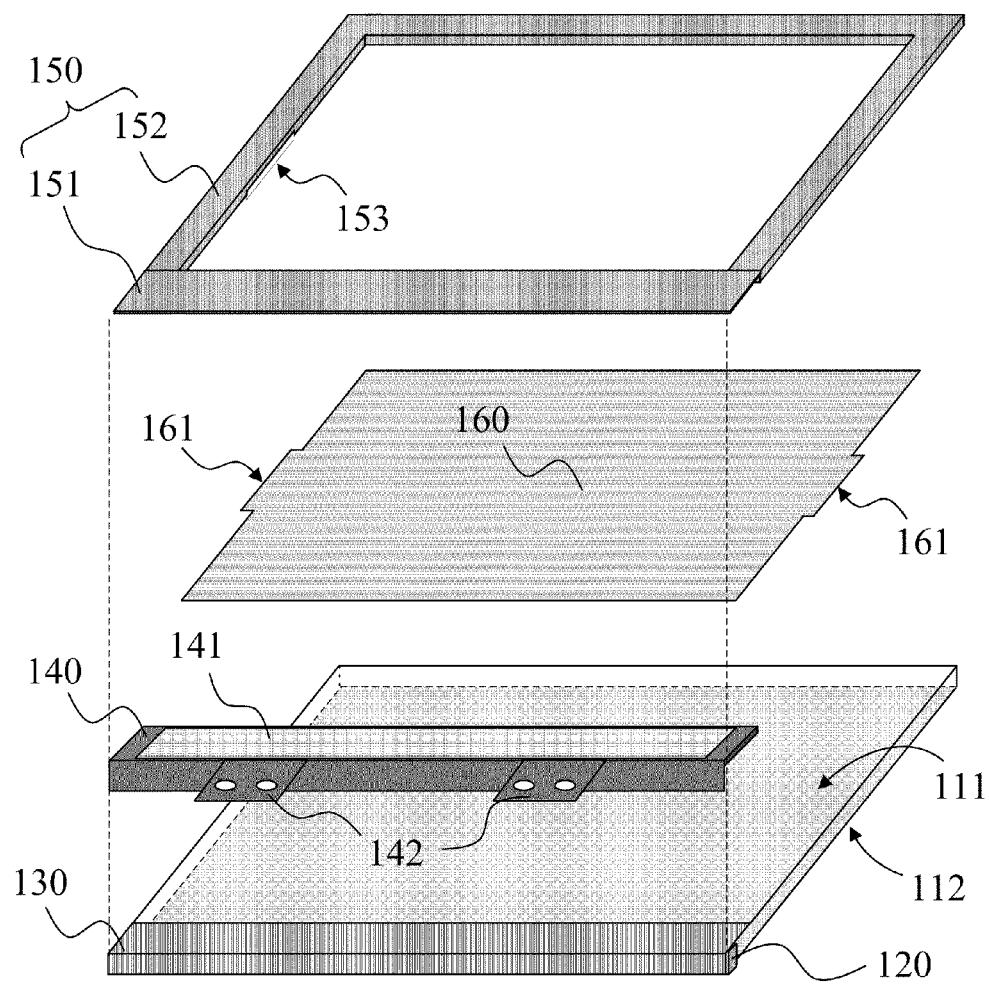
FIGS. 4A, 4B, and 4C are drawings (II) of components of an alternate embodiment of a liquid crystal display device of the present invention.
Figure 4B:
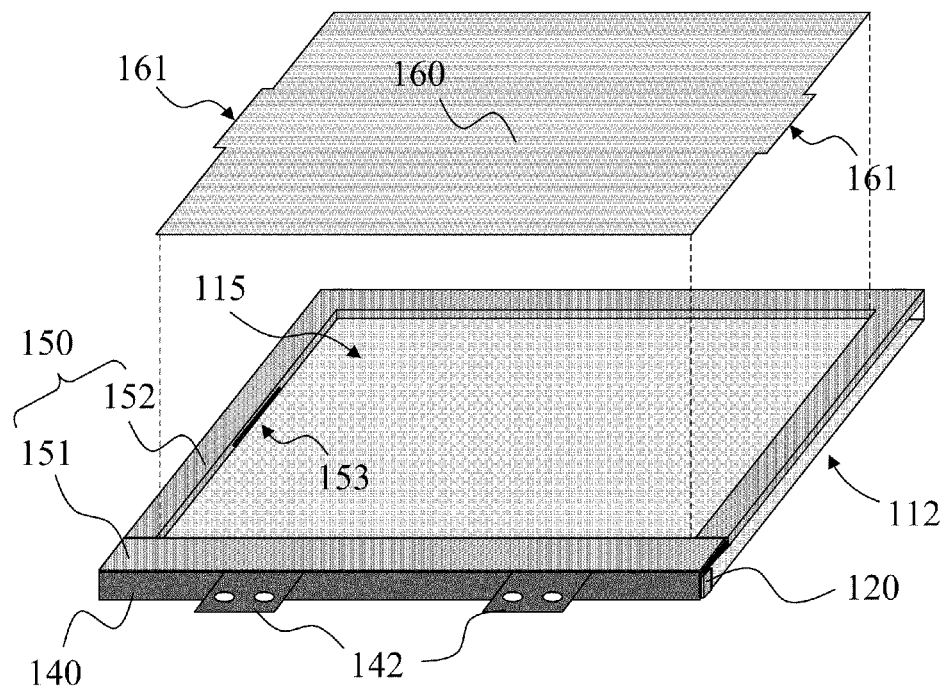
Figure 4C:
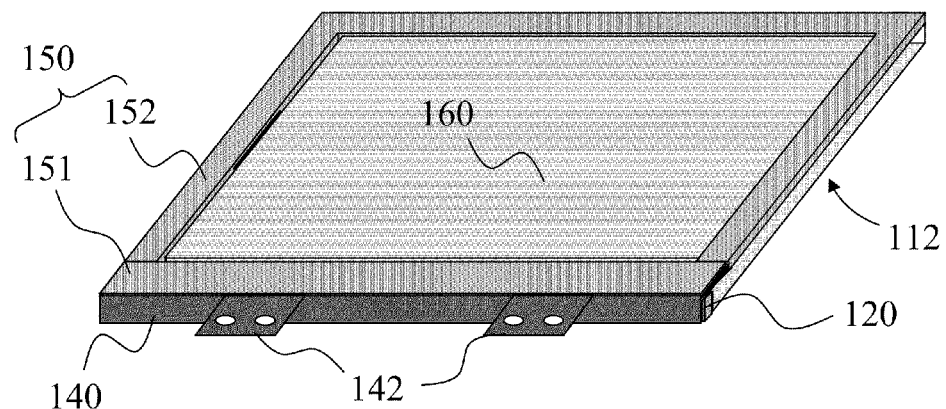

Then, the assembling relations among the circuit board holder 140, the elastic support piece 150, and the optical film 160 of a liquid crystal display device 100 are described herein by an alternate embodiment of the present invention. Refer to FIGS. 4A-4C, which are drawings (II) of components of an alternate embodiment of a liquid crystal display device of the present invention. The circuit board holder 140 is disposed upon the light source module 120 and a part of the upper surface 111 adjacent to the light input edge 113, and the first tape 130 is disposed therebetween. That is, the circuit board holder 140 lies on the light source module 120 and the peripheral area of the upper surface 112 of the light guide plate 110 adjacent to the light input edge 113. The elastic support piece 150, which may include rubber materials, is disposed on the upper surface 111 of the light guide plate 110 and surrounds the upper surface 111 of the light guide plate 110 to form an accommodating space 115. The optical film 160, such as diffuser, brightness enhancement film or prism, is disposed in the accommodating space 115. The material of the elastic support piece 150 may not be limited to rubber materials, but other materials such as foamed plastics and etc.

Some part of elastic support piece 150 is disposed on the circuit board holder 140. That is, the elastic support piece 150 includes a first prop component 151 and a second prop component 152, wherein the first prop component 151 is positioned between the panel 170 and the circuit board holder 140, and the second prop component 152 is positioned between the panel 170 and the light guide plate 110. As shown in FIG. 4A, the top of the first prop component 151 is as high as the top of the second prop component 152, that is, the tops of the first prop component 151 and the second prop component 152 are of the same height. Such that the panel 170 (see FIG. 5A) may be flatly disposed upon the elastic support piece 150.

In addition, as shown in FIGS. 4A and 4B, the elastic support piece 150 includes at least a trough 153 which has an opening facing to the accommodating space 115, and the optical film 160 includes at least a flange 161. The flange 161 can be fit into the trough 153 to fasten the optical film 160 within the accommodating space 115. Furthermore, because the trough 153 opening faces to the accommodating space 115, the flange 161 may be inserted and fit into the trough 153 so that the horizontal and the vertical displacements of the optical film 160 are constrained by the upper rim, i.e. the elastic support piece 150, of the trough 153. Therefore, the optical film 160 is secured within the accommodating space 115.

Moreover, a liquid crystal display device 100 of the present invention includes a second circuit board 141 (see FIG. 4A), which is disposed on the circuit board holder 140 and electrically connecting to the panel 170 for driving the panel 170. In addition, the circuit board holder 140 includes an ear portion 142 protruding outward for supporting the second circuit board 141. In this embodiment of the present invention, two ear portions are applied to support the second circuit board 141, but are not limited to. One or more ear portions can be used according to the present invention.

Figure 5A:
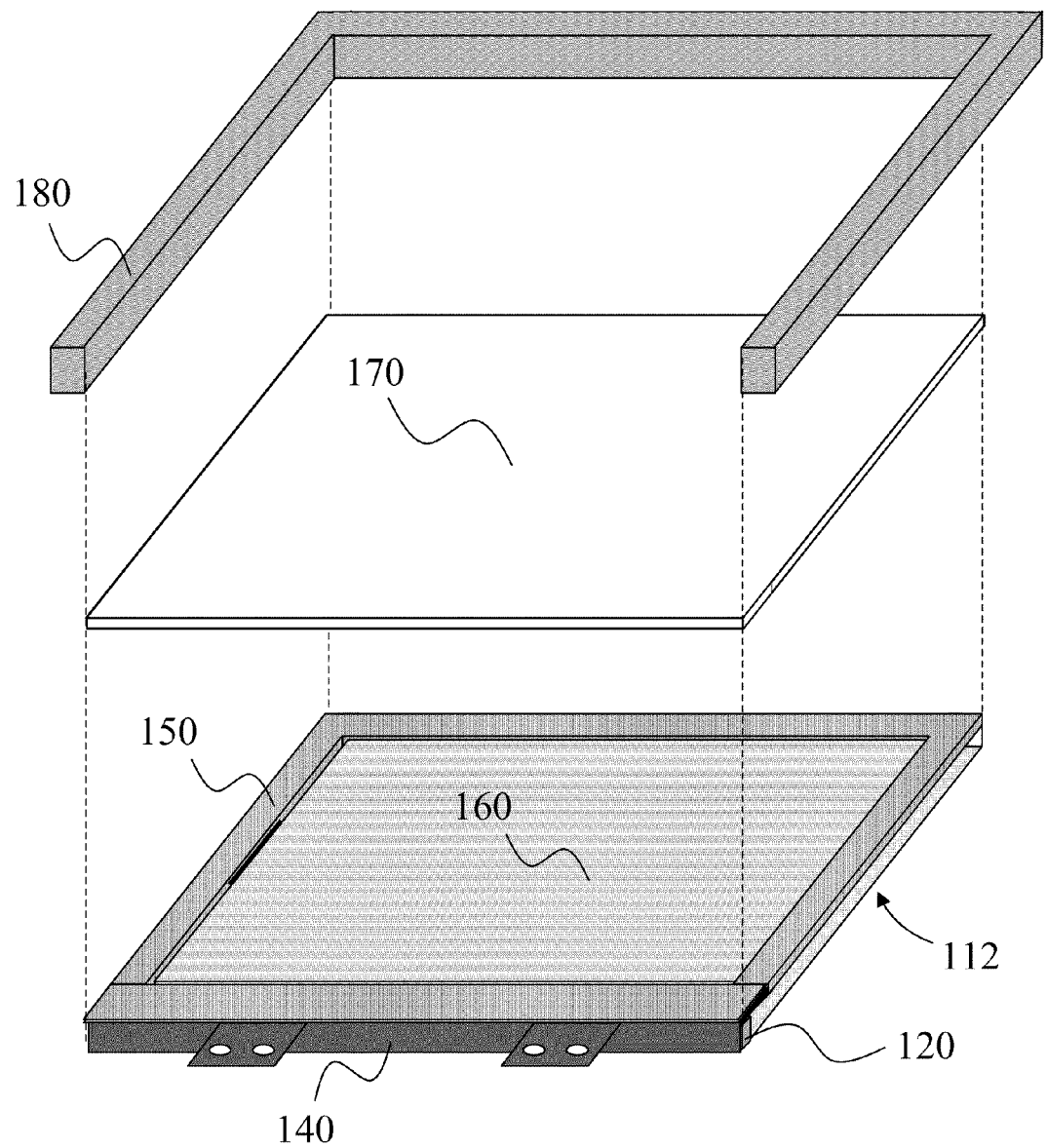
FIGS. 5A and 5B are drawings (III) of components of an alternate embodiment of a liquid crystal display device of the present invention.
Figure 5B:
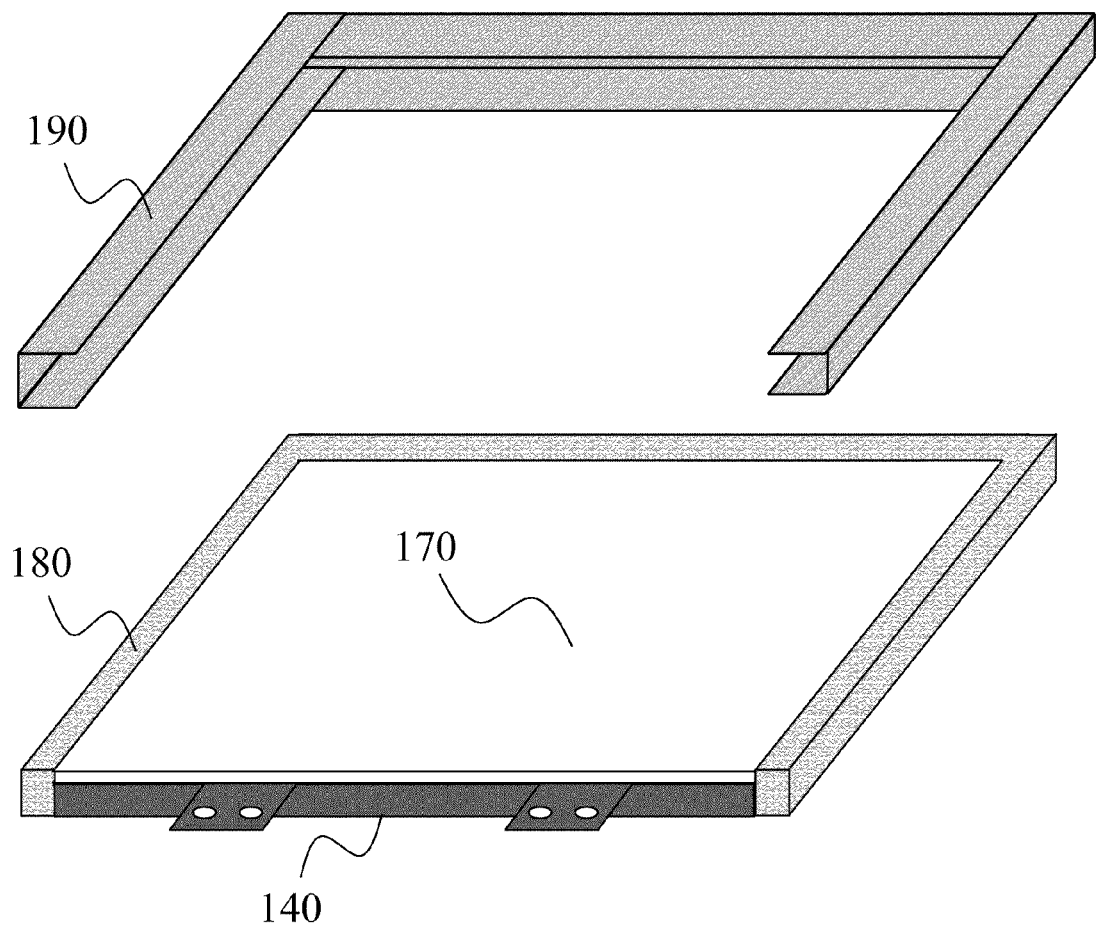

And next, the assembling relations between the panel 170 and the elastic buffer piece 180 of a liquid crystal display device 100 are described herein by an alternate embodiment of the present invention. Refer to FIGS. 5A and 5B, which are drawings (III) of components of an alternate embodiment of a liquid crystal display device of the present invention. The panel 170, which is the optical glass set of a liquid crystal display device 100, is disposed upon the elastic support piece 150. Owing to the tops of the first prop component 151 and the second prop component 152 are of the same height, the panel 170 can be disposed flatly upon the elastic support piece 150 and cover the accommodating space 115.

Three edges of the panel 170 are aligned to the three edges of the light guide plate 110 other than the light input edge 113 of the light guide plate 110. That is, the three edges of the light guide plate 110, each of which is not the light input edge 113, are aligned to the three respective edges of the panel 170. And, the elastic buffer piece 180 is leaned on the outside edges of both the panel 170 and the light guide plate 110, preferably surrounds the three outside edges of both the panel 170 and the light guide plate 110 other than the light input edge 113 of the light guide plate 110. Wherein the material of the elastic buffer piece 180 is, for example but not limited to, rubber materials. The elastic buffer piece 180 can be other materials such as foamed plastics and etc.

In addition, as shown in FIG. 5B, the liquid crystal display device 100 of the present invention further includes a second tape 190, which is pasted on peripheral area of the panel 170 surface, outer surfaces of the elastic buffer piece 180 and the lower surface 112 of the light guide plate 110. The second tape 190 may wrap and attach the elastic buffer piece 180 to the three outside edges of the panel 170 other than the light input edge 113 of the light guide plate 110 as the liquid crystal display device 100 shown in FIG. 1.

Figure 6A:
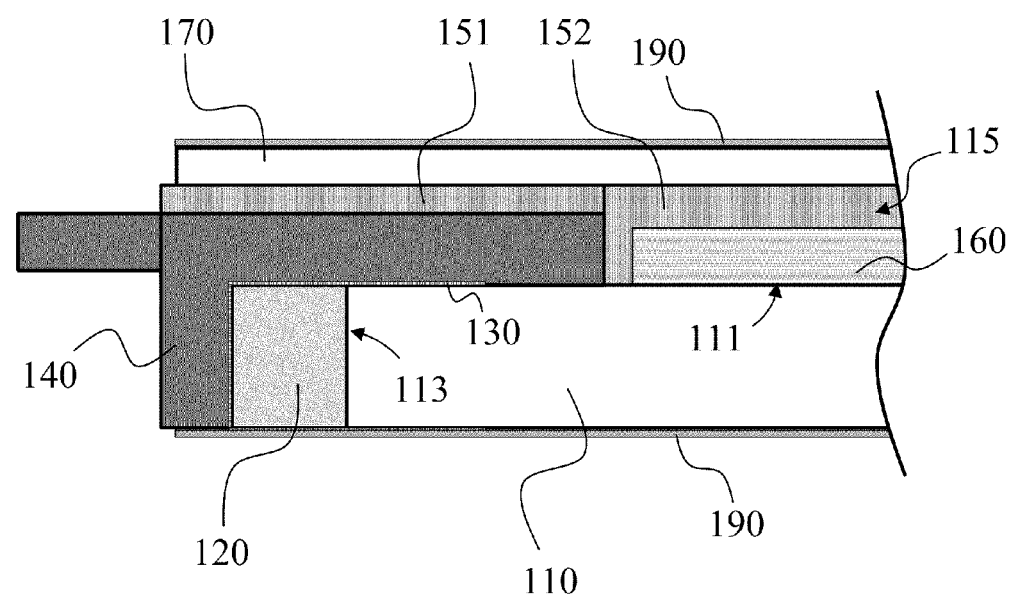
FIG. 6A is a sectional drawing of the broken line A in FIG. 1.
Figure 6B:
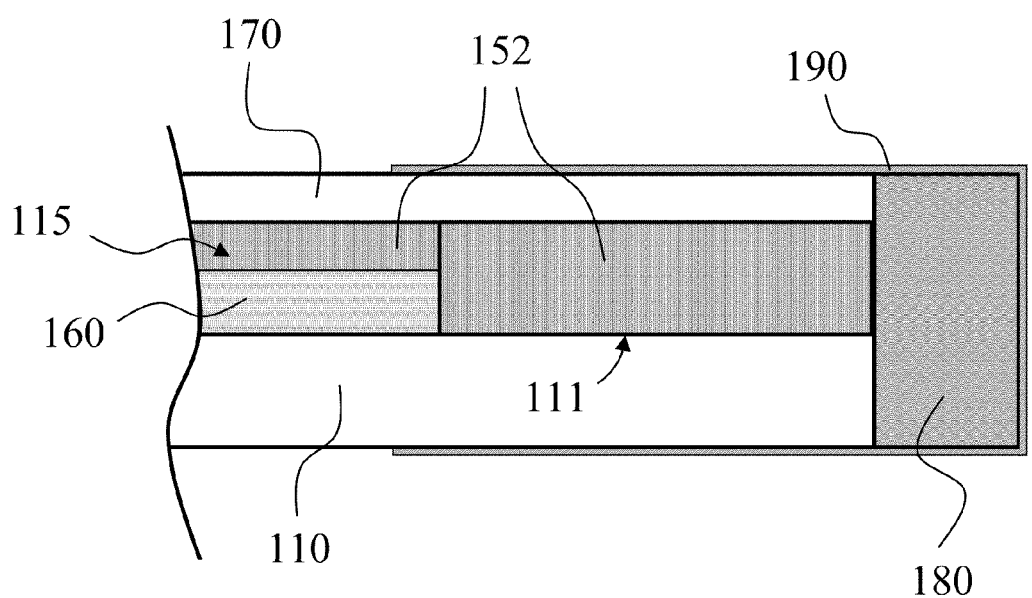
FIG. 6B is a sectional drawing of the broken line B in FIG. 1.

Last but not least, please refer to FIGS. 6A and 6B, which are the sectional drawings of broken lines A and B of FIG. 1 respectively, describing the assembling relations of all of the components.

As shown in FIGS. 6A and 6B, from bottom to top, a liquid crystal display device 100 are composed of a light guide plate 110 and a light source module 120, a circuit board holder 140, at least an optical film 160, an elastic support piece 150 having a first prop component 151 and a second prop component 152, and a panel 170. The light source module 120 is wrapped by the first tape 130 and leaned on the light input edge 113 of the light guide plate 110. The circuit board holder 140 is disposed upon the light source module 120 and a part of the upper surface 111 adjacent to the light input edge 113, and a first tape 130 is disposed between the light source module 120, the upper surface 111 and the circuit board holder 140. The first prop component 151 is positioned between the panel 170 and the circuit board holder 140, and the second prop component 152 is positioned between the panel 170 and the light guide plate 110, wherein the tops of the prop component 151 and the second prop component 152 are of the same height. The first prop component 151 and the second prop component 152 surround the periphery of the upper surface 111 of the light guide plate 110 to form an accommodating space 115, and the optical film 160 is disposed within the accommodating space 115 and lies on the upper surface 111 of the light guide plate 110. The panel 170 is flatly disposed upon the first elastic support piece 150 and the second prop component 152. The elastic buffer piece 180 is preferably leaned on three outside edges of both the panel 170 and the light guide plate 110 other than the light input edge 113 of the light guide plate 110, that is, only one side of the panel 170 and the light guide plate 110 where the circuit board holder 140 is disposed that does not have an elastic buffer piece 180. A second tape 190 is wrapped on the peripheral area of the three sides of both the panel 170 and the light guide plate 110 other than the light input edge 113 of the light guide plate 110. Therefore, the second tape 190 is pasted on the peripheral area of the upper surface of the panel 170, the outer surfaces of the elastic buffer piece 180, and the lower surface of the light guide plate 110 to wrap and attach the elastic buffer piece 180 to the three outside edges of both the panel 170 and the light guide plate 110 other than the light input edge 113 of the light guide plate 110.

As shown in FIGS. 6A and 6B, from bottom to top, a liquid crystal display device 100 are composed of a light guide plate 110 and a light source module 120, a circuit board holder 140, at least an optical film 160, an elastic support piece 150 having a first prop component 151 and a second prop component 152, and a panel 170. The light source module 120 is wrapped by the first tape 130 and leaned on the light input edge 113 of the light guide plate 110. The circuit board holder 140 is disposed upon the light source module 120 and a part of the upper surface 111 adjacent to the light input edge 113, and a first tape 130 is disposed between the light source module 120, the upper surface 111 and the circuit board holder 140. The first prop component 151 is positioned between the panel 170 and the circuit board holder 140, and the second prop component 152 is positioned between the panel 170 and the light guide plate 110, wherein the tops of the prop component 151 and the second prop component 152 are of the same height. The first prop component 151 and the second prop component 152 surround the periphery of the upper surface 111 of the light guide plate 110 to form an accommodating space 115, and the optical film 160 is disposed within the accommodating space 115 and lies on the upper surface 111 of the light guide plate 110. The panel 170 is flatly disposed upon the first elastic support piece 151 and the second elastic support piece 152. The elastic buffer piece 180 is preferably leaned on three outside edges of both the panel 170 and the light guide plate 110 other than the light input edge 113 of the light guide plate 110, that is, only one side of the panel 170 and the light guide plate 110 where the circuit board holder 140 is disposed that does not have an elastic buffer piece 180. A second tape 190 is wrapped on the peripheral area of the three sides of both the panel 170 and the light guide plate 110 other than the light input edge 113 of the light guide plate 110. Therefore, the second tape 190 is pasted on the peripheral area of the upper surface of the panel 170, the outer surfaces of the elastic buffer piece 180, and the lower surface of the light guide plate 110 to wrap and attach the elastic buffer piece 180 to the three outside edges of both the panel 170 and the light guide plate 110 other than the light input edge 113 of the light guide plate 110.

Accordingly, by implementing a liquid crystal display device of the present invention, plastic frames or metal frames of a conventional liquid crystal display module are not needed. The thickness of a whole liquid crystal display device is therefore reduced to achieve the purpose for thinning a liquid crystal panel, and the weight can also be lightened effectively as well as remained its structural strength. In addition, by implementing a liquid crystal display device of the present invention, the assembly is easy and the cost is effectively lowered.

It is to be understood that the claims are not limited to the precise configuration and components illustrated above. Various modifications, changes and variations may be made in the arrangement, operation and details of the methods and apparatus described above without departing from the scope of the claims. While the foregoing is directed to aspects of the present disclosure, other and further aspects of the disclosure may be devised without departing from the basic scope thereof, and the scope thereof is determined by the claims that follow.

What is claimed is:

1. A liquid crystal display device, comprising:
   a light guide plate having an upper surface, a lower surface and a light input edge, wherein the upper surface and the lower surface are opposite to each other and adjacent to the light input edge;
   a light source module being disposed close to the light input edge;
   a first tape being wrapped externally and pasted on the light source module and the light guide plate;
   a circuit board holder being disposed above the light source module and a part of the upper surface adjacent to the light input edge;
   an elastic support piece being disposed on the upper surface of the light guide plate and surrounding the periphery of the upper surface to form an accommodating space, wherein a part of the elastic support piece is disposed on the circuit board holder;
   an optical film being disposed in the accommodating space;
   a panel being disposed upon the elastic support piece and covering the accommodating space;
   an elastic buffer piece being leaned on outside edges of both the panel and the light guide plate; and
   a first circuit board being disposed on the circuit board holder and electrically connecting to the panel for driving the panel.

2. The liquid crystal display device of claim 1, further comprising a second tape being pasted on peripheral area of the panel surface, outer surfaces of the elastic buffer piece and the lower surface of the light guide plate for wrapping and attaching the elastic buffer piece to the outside edges of both the panel and the light guide plate.

3. The liquid crystal display device of claim 1, wherein the elastic support piece comprises rubber materials.

4. The liquid crystal display device of claim 1, wherein the elastic buffer piece comprises rubber materials.

5. The liquid crystal display device of claim 1, wherein the elastic support piece comprises a trough, which has an opening facing toward the accommodating space, and the optical film comprises a flange, fitting into the trough for fastening the optical film within the accommodating space.

6. The liquid crystal display device of claim 1, wherein the light source module comprises a second circuit board and an light emitting component disposed on the second circuit board, wherein the first tape is pasted on the lower surface of the light guide plate, a side of the second circuit board far away from the light emitting component, and the upper surface.

7. The liquid crystal display device of claim 1, further comprising a reflective plate being disposed on the lower surface of the light guide plate.

8. The liquid crystal display device of claim 7, wherein the light source module comprises a second circuit board and an light emitting component disposed on the second circuit board, wherein the first tape is pasted on a side of the reflective plate far away from the light guide plate, a side of the second circuit board far away from the light emitting component, and the upper surface of the light guide plate.

9. The liquid crystal display device of claim 1, wherein the circuit board holder comprises an ear portion protruding outward for supporting the first circuit board.

10. The liquid crystal display device of claim 1, wherein the elastic buffer piece is leaned on three of the outside edges of both the panel and the light guide plate other than the light input edge of the light guide plate.

11. The liquid crystal display device of claim 1, wherein the first tape comprises a reflective layer.

12. The liquid crystal display device of claim 1, wherein the elastic support piece comprises a first prop component and a second prop component, wherein the first prop component is positioned between the panel and the circuit board holder, and the second prop component is positioned between the panel and the light guide plate.

13. The liquid crystal display device of claim 12, wherein the top of the first prop component is as high as the top of the second prop component.

14. The liquid crystal display device of claim 1, wherein the edges of the panel are aligned to three edges of the light guide plate other than the light input edge of the light guide plate.

* * * * *